Oct. 12, 1943.    E. K. SCOGGIN    2,331,737
THERMAL STOKER TIMER
Filed Aug. 2, 1939
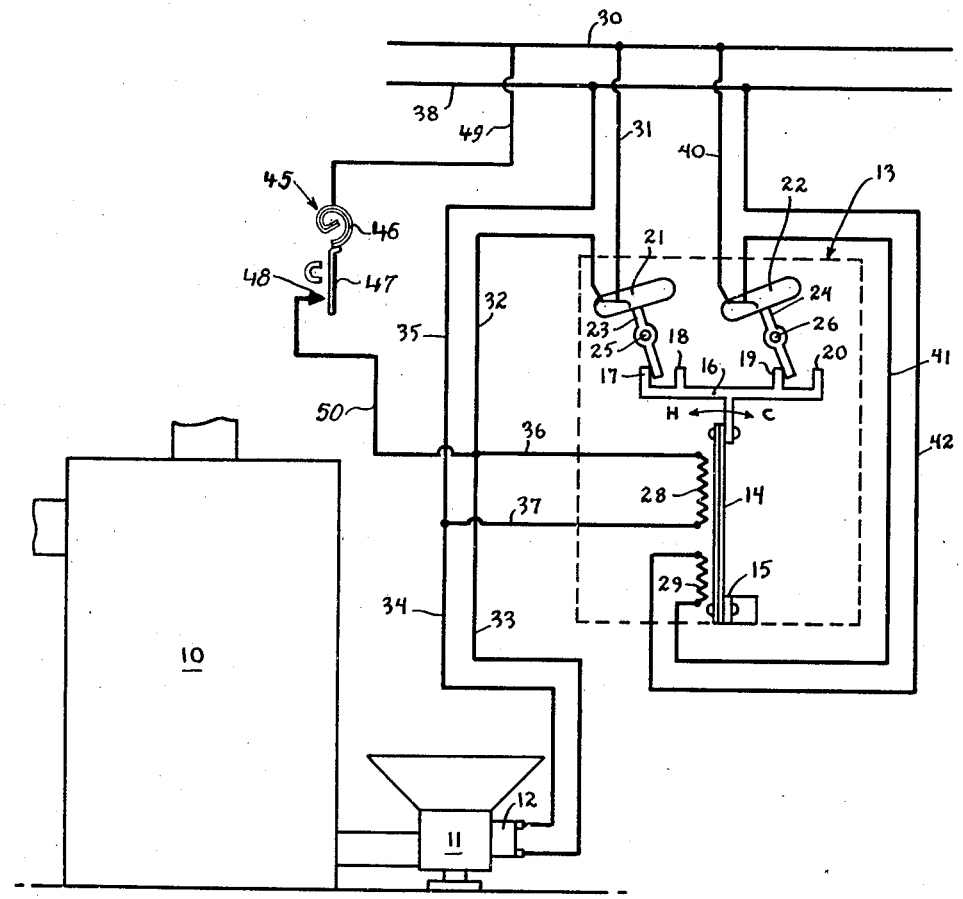
Inventor
Elmer K. Scoggin
By George H. Fisher
Attorney Patented Oct. 12, 1943

2,331,737

UNITED STATES PATENT OFFICE 2,331,737

THERMAL STOKER TIMER

Elmer K. Scoggin, Minneapolis, Minn., assignor to Minneapolis-Honeywell Regulator Company, Minneapolis, Minn., a corporation of Delaware Application August 2, 1939, Serial No. 287,951

6 Claims. (Cl. 200—122)

My invention relates to automatic time control mechanisms, and deals particularly with timers for use in automatically operating stokers at spaced intervals. The timed operation may be for the purpose, among others, of maintaining a fire in a combustion chamber when it might otherwise go out.

The object of my invention is to provide a simple, cheap but effective automatic stoker timing mechanism.

Another object is to provide a heat actuated timing device capable of repeatedly going through uniform operating cycles.

Another object is to produce a uniform recurrent cycling operation by means of a thermal timer, the cycles comprising relatively short "on" periods of a switch or the like with relatively long intervals between the "on" periods, that is, relatively long "off" periods. Ordinarily thermal timers cool faster than they heat. With known thermal timers wherein a switch closes when the timer is cold and opens after the timer is heated, the arrangement has not been adapted to producing uniform cycles having short "on" periods and relatively long "off" periods. As stated above an object of my invention is to attain this end with a thermal timer.

Another object of my invention is to produce a desired relation between the duration of "on" periods and the duration of "off" periods of a switch actuated by a thermal timer by varying the rate of heating of the timer.

Another object of my invention is the provision of a thermal timer having two heaters one of which heats at a relatively high rate and is cut off first and the other of which heats at a lower rate and is cut off later.

Another object is the provision of a thermal timer having a thermal element actuating two switches which close at the same time and open at different times, the switches controlling separate heaters of different sizes, the larger heater being cut off when the first switch opens.

Another object is to provide a thermal timer having a switch controlling the heat supply thereto wherein heating continues for a time after the said switch opens.

Other objects of the invention will become apparent from an inspection of the accompanying drawing and detailed description.

The single figure of the drawing represents diagrammatically a stoker fired furnace or boiler controlled by the timing device of my invention.

Numeral 10 of the drawing represents a furnace or boiler fired by an automatic stoker 11. The stoker is driven by an electric motor the terminal box of which is indicated at 12.

My invention is concerned primarily with a timing device designated generally at 13 which in the present instance I employ for automatically starting and stopping the stoker 11. The timing unit comprises a bimetal heat responsive element 14 supported by a bracket 15 and carrying a switch actuating member 16 at its opposite end, the member 16 being attached to the bimetal element by riveting or the like. The member 16 has upstanding fingers or projections 17 and 18 adjacent each other at one end and upstanding fingers 19 and 20 adjacent each other at the other end. The upstanding fingers on the member 16 act as yokes for actuating mercury switches 21 and 22 carried on arms 23 and 24. The arms 23 and 24 are pivoted at 25 and 26, respectively, and engage their pivots frictionally so that the arms can be rotated on their pivots but will remain in any position to which they are adjusted unless forcibly removed therefrom. The lower end of the arm 23 lies between the fingers 17 and 18, and the lower end of the arm 24 lies between the fingers 19 and 20. The fingers 19 and 20 are spaced slightly farther apart than the fingers 17 and 18 for a reason which will presently become apparent. The spacing of both pairs of fingers may be made adjustable.

Adjacent the bimetal element 14 is an electrical heating resistance 28 and below the heater 28 adjacent the lower part of the element 14 is a second smaller heating resistance 29.

With the parts in the position shown the timing unit is cold, the element 14 having flexed to the right, that is, in cooling direction, just sufficiently for the fingers 17 and 19 to have closed the mercury switches 21 and 22 by reason of engagement of the fingers 17 and 19 with the arms 23 and 24, respectively, moving them in a counter-clockwise direction. Closure of mercury switch 21 completes a circuit for the stoker motor as follows: from line conductor 30 through wire 31, mercury switch 21, wire 32, wire 33, terminal box 12, wire 34, wire 35 back to line conductor 38. The line conductors 30 and 38 may be connected to any suitable source of external power. Closure of mercury switch 21 also completes a circuit parallel to the one just described for energizing the heater 28 as follows: from line conductor 30 to wire 31, mercury switch 21, wire 32, wire 36, heater 28, wire 37, and wire 35 back to line conductor 38. Closure of mercury switch 22 completes a circuit for energizing the heater 29 at the same time that the above described circuits are completed, this latter circuit being as follows: from line conductor 30 through wire 40, mercury switch 22, wire 41, heater 29 and wire 42 back to line conductor 38. Upon completion of the above described circuits operation of the stoker begins and the bimetal element 14 is heated by both the heaters, tending to cause it to flex to the left as indicated on the drawing. Movement of the member 16 to the left by element 14 will cause fingers 17 and 19 to move away from the lower ends of arms 23 and 24 but the arms will remain in their positions as shown on the drawing by reason of the frictional engagement of the arms on their pivots. After a period of five minutes, for example, during which time the stoker has been operating finger 18 will engage the lower end of arm 23 rotating the arm in a clockwise direction and open mercury switch 21. Fingers 19 and 20 being more widely spaced than fingers 17 and 18, the finger 20 will not yet engage arm 24 so as to open mercury switch 22. Upon opening of mercury switch 21 the stoker will stop and heater 28 will be deenergized. While heater 29 remains on, there will be a slow rate of heat input to the element 14 which will prevent it from moving back in cooling direction and it will continue to flex to the left slowly in heating direction. After the lapse of another period of time which may be thirty minutes, for example, due to the slow rate of heating by heater 29 finger 20 will finally engage the lower end of arm 24 and open mercury switch 22, mercury switch 21 being moved to a farther open position during this time. After heater 29 is deenergized the cooling part of the cycle of operation will begin and the element 14 will start to flex to the right. As element 14 flexes to the right, finger 17 will first engage the lower end of arm 23 because arm 23 was rotated farther in a clockwise direction than was arm 24 and the finger 19 will then pick up or engage the lower end of arm 24. When finger 19 picks up arm 24, the arms 24 and 23 will be parallel as shown on the drawing, the distance between fingers 17 and 19 being such as to move arms 23 and 24 in parallelism, in closing direction of the switches. When cooling has continued for thirty minutes, for example, the member 16 will have moved the arms 23 and 24 into the position shown wherein the mercury switches are closed and the cycle as above described will be repeated. Switches 21 and 22 are similarly mounted on arms 23 and 24 and close at the same time when arms 23 and 24 are in a predetermined parallel position, but as described above, the switch 21 is opened after a relatively short period of heating while the switch 22 is not opened until a relatively longer time has elapsed.

From the foregoing description of the operating cycle it is to be seen that the stoker is operated five minutes and remains off for a period including thirty minutes of heating of the timing unit and thirty minutes of cooling of the timing unit. The duration of these various intervals are of course mentioned as being exemplary and they might be varied relatively over a considerable range. When my invention is used for controlling a stoker as shown its purpose is that of operating the stoker intermittently at intervals for purposes of maintaining a fire in a furnace or boiler.

As is customary in arrangements of this general type, a thermostat 45 may be connected in parallel with the stoker timer. This thermostat is of entirely conventional structure comprising a bimetallic element 46, a contact arm 47, and a contact 48. The thermostat 45 is connected in parallel with switch 21 of my timing device so that upon the thermostat calling for heat at any time, the stoker motor is operated independently of the switch 21 by reason of the establishment of the following circuit: from line wire 30 through conductor 49, bimetallic element 46, contact arm 47, contact 48, conductors 50 and 33, stoker motor 12, and conductors 34 and 35 to line wire 38.

From the foregoing the novelty and utility of my improved timing arrangement will be apparent to those skilled in the art. The arrangement provides a timing unit whereby uniform cycles of operation may be produced wherein there is a short "on" period of a switch operated by the timer followed by a relatively long "off" period. In my timing arrangement there is a relatively short period of heating until the switch controlling the stoker is open; cooling does not then immediately begin but there is a relatively long period of heating at a low rate before cooling begins. Thus my invention does not depend solely upon a relatively long period of cooling to space relatively short periods of heating by a definite time. In timers where there is a short period of heating followed at once by a longer period of cooling before another heating period is begun, the timing is erratic and very unreliable because of the susceptibility to variations in cooling time due to the effect of ambient temperatures. It is well known that the cooling time of thermal timers is very critical to ambient temperatures. In my arrangement, as is apparent, there is a slow rate of heating during a part of the period during which the timer would otherwise be cooling. By this arrangement, the cycling becomes considerably more uniform and accurate.

The single embodiment of my invention which I have disclosed and described in detail is representative of various forms and modifications which it might take. The disclosure is illustrative and the scope of the invention is to be determined in accordance with the appended claims.

I claim as my invention:

1. In a timing mechanism, in combination, a movable thermal responsive member, first and second heaters for heating said member, said member being moved in one direction when heated and returning in the opposite direction upon cooling, first and second switches controlling said heaters, and actuating means for said switches operated by said member, said switches being simultaneously closed as said element moves in said one direction in response to cooling, and sequentially opened as said element moves in said opposite direction upon being heated.

2. In a timing mechanism, in combination, a heat responsive element movable between hot and cold positions, a pair of heaters for said element, a pair of switches controlling said heaters, and actuating means for said switches operated by said element, said switches being simultaneously closed as said element moves from said hot to said cold position, and sequentially opened as said element moves from said cold to said hot position.

3. In a timing mechanism, in combination, a heat responsive element movable between hot and cold positions, a first heater for said element, a first control switch for said first heater actuated by said element, said first switch being closed when said element is in said cold position and opened when said element is in said hot position, a second heater for said element, a second control switch for said second heater also actuated by said element, and coordinating connecting means for causing said second switch to be simultaneously closed with said first switch and opened prior to the opening of said first switch.

4. In a timing switch for periodically causing the energization of a device for timed periods, a first switch adapted to control the energization of said device, a second switch, each of said switches being movable between first and second controlling positions, a thermal responsive element movable in either of two directions depending upon whether said element is being heated or is cooling, an electric heater adjacent said element, means for controlling the energization of said electric heater by said second switch, and means operatively connecting said element to both of said switches and effective upon said element moving in one of said directions to sequentially move said switches to said first controlling position and upon said element moving in the other direction to substantially simultaneously move said switches to their second controlling position.

5. In a timing switch for causing the energization of a device for timed periods, a first switch adapted to control the energization of said device, a second switch, a thermal responsive element movable in one direction when heated and returning in the opposite direction when cooled, an electric heater adjacent said element, means for controlling the energization of said electric heater by said second switch and means operatively connecting said element to said switches and effective upon said element moving in said one direction first to open said first switch and then to open said second switch and upon said element moving in said opposite direction to substantially simultaneously close said switches.

6. In a timing mechanism, a control member, a switch, a thermal responsive element movable in either of two directions depending upon whether said element is being heated or is cooling, an electric heater adjacent said element, means for controlling the energization of said electric heater by said switch, two pairs of spaced fingers positioned by said element, means operatively connecting one pair of spaced fingers to said control member to move said control member between two positions upon movement of said element through a distance dependent upon the spacing of the fingers, and means operatively connecting the other pair of spaced fingers to said switch to move said switch between open and closed positions upon movement of said element through a distance dependent upon the spacing of the fingers of that pair, and the spacing of the fingers of one pair being different from the spacing of the fingers of the other pair.

ELMER K. SCOGGIN.